Dec. 2, 1941.  P. R. LEE  2,264,988

MOUNTING OF BIMETALLIC ELEMENTS

Filed July 31, 1940

WITNESSES:
Edward Michaels
H.G. Hepler

INVENTOR
Paul R. Lee.
BY
W.R. Coley
ATTORNEY

Patented Dec. 2, 1941

2,264,988

UNITED STATES PATENT OFFICE 2,264,988

MOUNTING OF BIMETALLIC ELEMENTS

Paul R. Lee, Mansfield, Ohio, assignor to Westinghouse Electric & Manufacturing Company, East Pittsburgh, Pa., a corporation of Pennsylvania Application July 31, 1940, Serial No. 348,741

6 Claims. (Cl. 200—139)

My invention relates to bimetallic snap-acting thermostats and more particularly to the mounting of the bimetallic elements thereof.

With the thermostats heretofore used, the bimetallic element thereof has, in many cases, been loosely attached to the supporting structure. The supporting or retaining member has, in most instances, constituted the adjusting screw. For example, in many cases, such elements have been loosely attached to the supporting structure so as to permit such bimetallic element to operate in a free unrestrained manner.

No inherently snap-acting thermostatic element known to me has been rigidly attached to the supporting structure at one point with a contact attached to a movable portion of such element and having an adjusting member engaging such element at a third point. In other words, no inherently snap-acting bimetallic element, insofar as I am aware, has heretofore been retained, in a closed or contact-engaged position, at three or more separate points, such points including the point of rigid attachment to the supporting structure and the point of engagement of the adjusting member.

While there have been mountings of resilient members having a similar configuration to that of the bimetallic member, hereinafter described, it is submitted that the operation of such resilient member is determined by the application of an exteriorly applied force, while the operation of the bimetallic member is entirely different in that it is wholly inherent within such member in response to the temperature thereof.

In building thermostats embodying my invention in which the thermostatic element thereof has at least three points of support or engagement, when in a closed position, such thermostats, when used in an adjustable manner, for example, are subject to considerable undesirable variations in temperature range from the low to the high setting of the adjusting member. In other words, assuming that the normal range of the adjustable thermostat was designed to be between 200° and 500°, the range of such thermostat may, however, unless constructed in accordance with my invention hereinafter described, vary between, say, 200° F. to 400° F. on the one hand or 300° F. to 500° F. on the other. In addition to these undesirable variations in temperature range, a thermostat having the above-mentioned three points of support, unless constructed in line with the disclosure hereinafter described, will have an undesirable variation or non-uniformity in temperature differential over the working range of the thermostat. For practical operating purposes, a thermostat must not have any great variation in temperature differential over its range. However, thermostats not built in accordance with the teaching of my invention will have variable temperature differentials of, for example, 30° at their low setting and 100° at their middle setting or they may have other uneven or undesirable temperature differentials.

I have been able to overcome these undesirable features, which greatly restrict the use of inherently snap-acting thermostats, by finding that such thermostatic elements must have their free operating end positioned substantially within the neutral zone of such element, as determined by the elements in an unrestrained condition.

It is therefore an object of my invention to provide a thermostat having the bimetallic element thereof mounted in such a manner that such thermostat may be manufactured under normal and relatively inexpensive manufacturing conditions, without having undesirable variations in temperature range thereof and without having undesirable variations in the temperature differential, by disposing the movable or contact portion of the bimetallic element, when in a contact-engaged position, within the actual neutral zone of such link.

A further object of my invention is to provide a method of manufacturing a bimetallic snap-acting thermostat which eliminates undesirable variations in the operations thereof.

Another object of my invention is to provide a novel and effective method of mounting an inherently snap-acting thermostat on a supporting structure in cooperation with an adjusting member.

Other objects of my invention will either be pointed out specifically in the course of the following description of a device embodying my invention, or will be apparent from such description.

Referring to the accompanying drawing.

Figure 1:
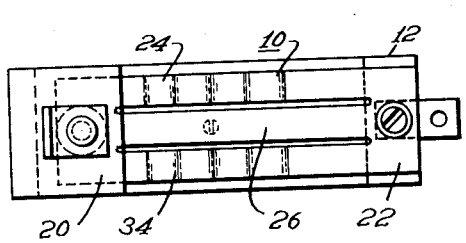
Figures 1 and 2 are side elevational and bottom views, respectively, of a thermostat embodying my invention.
Figure 2:
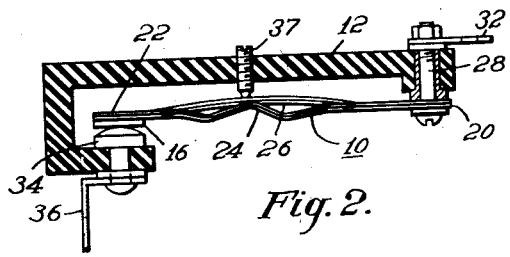

Referring to the accompanying drawing in which like reference characters indicate like parts in the several figures, I show an inherently snap-acting bimetallic element 10 mounted within a supporting structure 12, in Fig. 1, and within a supporting structure 14 in Fig. 2, having movable contacts 16 and 18, respectively, attached to a movable portion of the element.

The bimetallic element 10 comprises an elongated doubly-slotted strip-type bimetallic member having two end portions 20 and 22 joined by a plurality of longitudinally extending strips or leg portions 24 and 26. The strips 24 are positioned upon the outer edge of the element 10 and are corrugated so as to reduce the effective length of such strips, whereas the strip 26 is centrally located with respect to the exterior strips and is likewise joined to the end portions 20 and 22. The corrugation of the exterior strips 24 produces internal stresses and strains of such character that the element moves from one position to another with a snap-action in response to changes in temperature thereof. This bimetallic strip is not claimed per se herein but is more fully described and claimed in a copending application Serial No. 250,538, filed January 12, 1939, of mine assigned to the assignee of this application.

The bimetallic element 10 is rigidly attached to a supporting structure, in this instance, by means of one end portion 20. The element is shown as being attached to each of two different supporting structures (see Figs. 1 and 2 on the one hand, and Fig. 3 on the other). In both cases, the bimetallic element has three points of support when in a closed or engaged position, namely, the point of rigid attachment to the supporting structure (through end portion 20), the point of cooperation with the central strip 26 of an intermediately located adjusting member, such as 37 or 44, and the point of cooperation of the contact 16 or the contact 18 with corresponding stationary contacts, as hereinafter more fully described.

Referring in particular to the arrangement shown in Figs. 1 and 2, the bimetallic element 10 is rigidly attached to the supporting structure 12 (preferably of insulating material) by means of a suitable bolt 28 which bolt passes through the end portion 20 of said element. However, it will be understood that, if structure 12 is of metal, bolt 28 will be suitably insulated therefrom. The supporting structure 12 is, in this instance, an elongated relatively flat structure having a depending inwardly extending contact carrying portion. A suitable terminal 32 is attached to the bolt 28 so as to convey electric current from the terminal to the element 10. A stationary contact 34 is attached to supporting structure 12 and is positioned thereon so as to engage the movable contact 16 when such contact is in its engaged position. A second bent terminal strap 36 is attached to the contact 32 and is insulated from such supporting structure. Accordingly, passage of the current through the thermostat is from, say, terminal strap 32, bolt 28, bimetallic element 10, movable contact 16, stationary contact 34, and terminal strap 36.

A suitable adjustment screw 37 is threadedly attached to the supporting structure 12 and is adapted to engage or restrain movements of the central strip 26 of the bimetallic element 10 when the element is in its closed position. This screw is adapted to vary the position of such strip to adjust the opening temperature of the bimetallic element, it being understood that when such element is in its closed position, the central strip, when the element is sufficiently heated, will be moved downwardly away from the adjusting screw and the free end portion 22 will move upwardly to disengage the cooperating contacts 16 and 34, whereupon such element will function as an unrestrained bimetallic element. In other words, the thermostat shown in Figs. 1 and 2 will be adjustably disengageable and will return to its engaged position at a fixed temperature depending upon the heat treatment of the element 10, in a well-known manner.

Figure 3:
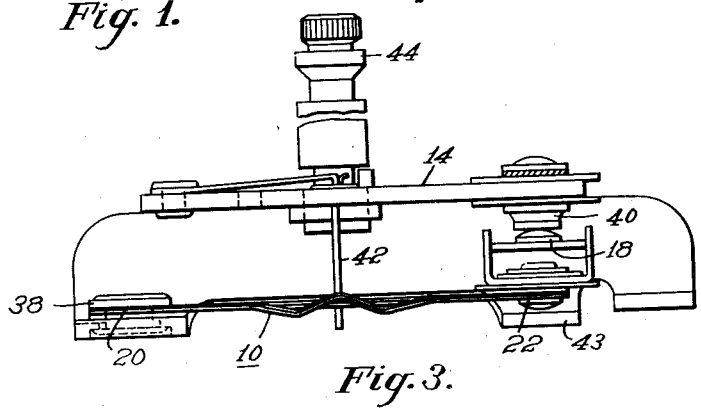
Fig. 3 is a side elevational view of another thermostat embodying my invention.

Referring to Fig. 3, the bimetallic element 10 is rigidly attached to the supporting structure 14 preferably, though not necessarily, of metal, by means of a suitable attaching member 38. The movable contact 18 is insulatedly attached to the movable end portion 22 of the element 10 and is adapted to cooperate with a suitable stationary contact 40. The supporting structure 14, comprises generally, an upstanding main or rear portion, an upper or adjusting member retaining portion, an outwardly extending bimetallic element retaining portion, and a stop portion 43. This structure is more fully described in E. K. Clark Patent 2,195,000, issued March 26, 1940, and assigned to the assignee of this application.

A suitable adjusting member 42 is preferably of U-shape and engages opposite sides of central strip 26, being operable by an adjusting knob 44 so as to adjust the opening and closing temperature of the bimetallic element 10 as attached to the supporting structure 14. The member 42 and its attachment to the central strip 26 are more fully described in the E. K. Clark patent hereinabove described. However, the bimetallic element 10, when cooperating with the supporting structure 14 and adjusting member 42 is likewise adapted to be supported at three points, when in a closed or engaged position; namely attaching member 38, adjusting member 42, and movable contact 18 cooperating with stationary contact 40. Such element is, in addition, adapted to be supported at three points when in its open position, at which time the movable end portion 22 of the element 10 engages the stop portion 43 of the supporting structure 14.

Figure 4:
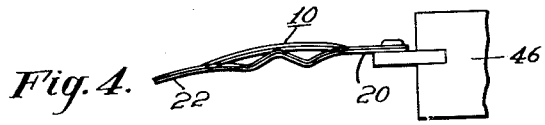
Fig. 4 illustrates a mounting of an unrestrained snap-acting bimetallic element used to ascertain the movements thereof when in such an unrestrained condition.
Figure 5:
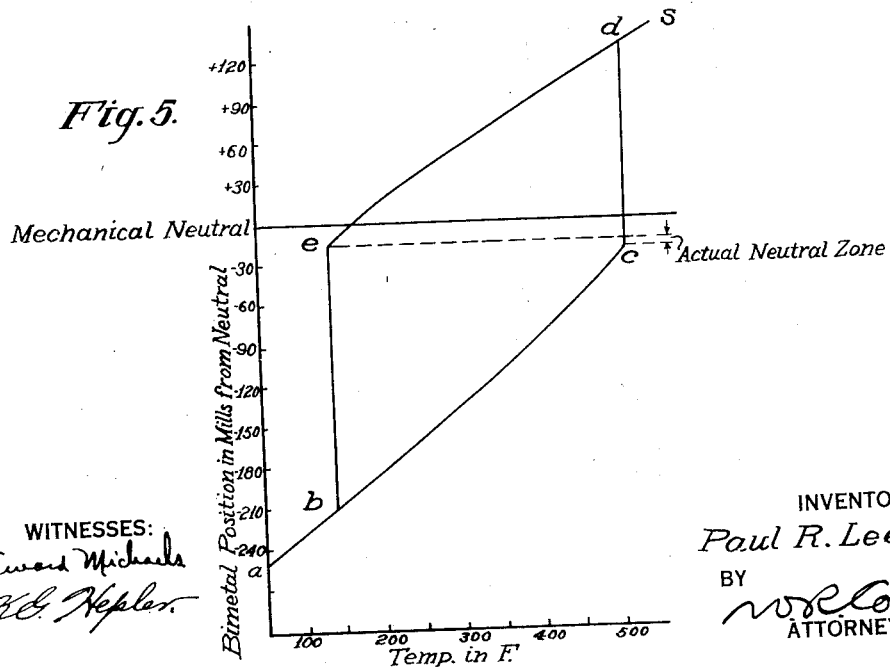
Fig. 5 is a curve illustrating the movements of the contact portion of the unrestrained inherently snap-acting bimetallic element of Fig. 4 throughout its temperature range.

Referring to Fig. 4, I show the bimetallic element 10 attached to a suitable supporting structure 46 so as to flex in an unrestrained manner. When mounted in this unrestrained manner, it will be noted that there is no adjusting screw engaging the central strip 26, or no restriction upon the movements of the free end portion 20 throughout the complete operating cycle of the element. It will be noted that the mounting of the stationary end of element 10 is equivalent to the mountings of the element in the preceding figures. The movement of the free end portion 22 of such element, in its thermostatic cycle, is illustrated by means of the curve shown in Fig. 5. The ordinates of this curve represent the position of the free end portion 20 of element 10 with respect to the mechanical neutral of such element, while the abscissae of such curve represents the temperature of the element. As will be noted, the free end portion 22 will be at point $a$ when at substantially 75° F. or substantially room temperature. Then upon the application of heat to the bimetallic element, the free end portion creeps around the curve a, b, c, and at substantially 510° F. or at point c the free end portion 22 snaps upwardly to a point d. Then if further heated, it will move from d to s. However, for the purposes of this discussion, it will be assumed that such further heating does not occur. Consequently, upon cooling of the bimetallic element after reaching point d, the free end portion 22 moves downwardly or along the curve es from d to e, at which time the temperature thereof will be substantially 136°. The end portion will then snap downwardly from e to b which is on the curve ac. The movements or position of the free end portion 22 of the unrestrained bimetallic element, at any given temperature, will at all times be on the curve a, b, c, d, e, as illustrated in Fig. 5. It will be noted that, in this particular instance, the positions of e and c are somewhat below the mechanical neutral of the element, the mechanical neutral being the point at which both the stationary and movable end portions of the bimetallic element are in substantially the same plane.

In addition, it will be noted that point e and point c are located varying distances below the mechanical neutral namely 0.010 inch and 0.015 inch, respectively. The difference between these two snapping points, namely c and e, is herein called the actual neutral zone of the element.

It is to be understood that the curve a, b, c, d, e illustrated in Fig. 5 is for a particular bimetallic element and that such curve will be slightly different for each individual bimetallic element retaining, however, substantially the same general configuration as the illustrated curve. In addition, the location of points c and e may vary somewhat above and somewhat below the mechanical neutral. The ideal towards which all elements are designed is that in which the mechanical neutral falls within the actual neutral zone of the particular element. However, due to usual manufacturing tolerances this optimum is not always reached.

It has been found from experience that, to have an efficiently operating thermostat, the location of the bimetallic element, which is rigidly attached to the supporting structure at one point and which is attached to the adjusting member at a second point, as in Fig. 3, must locate the movable or contact portion thereof within the following limits as regards the unrestricted movements of the particular element used within the thermostat in question; namely, the movable contact portion of the bimetallic element must be located within the actual neutral zone, when in a closed position, as hereinabove defined. In other words, with the element mounted in such a manner, the thermostat will operate without the undesirable variations in the temperature range and the temperature differentials, hereinabove described.

In addition, I have found that if the bimetallic element be positioned within a thermostat which has an adjustable member merely engaging rather than being attached to the central strip, as illustrated in Figs. 1 and 2, the movable end portion of such element must likewise be positioned within the actual neutral zone of the unrestricted movements of the element in question when such thermostat is in a closed or contact engaging position.

With thermostats constructed in such a manner, I have found that there is no material variation in the temperature range of the adjustable thermostat from the low to the high setting of the adjustable screw. Further, in such an adjustable thermostat, I have found that there is no undesirable variation in temperature differential throughout the range of operation of such thermostat.

I have found further that with thermostats in which the adjusting screw merely rests against the central strip, rather than limiting the movements thereof, throughout the complete operating cycle, such thermostat may be adjusted so as to vary the opening temperatures of such element without varying or changing the closing temperatures thereof.

It will, therefore, be seen that with elongated inherently snap-acting bimetallic elements having centrally located longitudinally extending strips joined by end portions, which elements are rigidly attached to a supporting structure at one point and which have the movement of a second or central snapping portion limited during the closing operation of such element, the movable or contact carrying portions of the element must be located within the actual neutral zone of such bimetallic element, as determined by the element when in an unrestrained condition.

While I have shown my invention in but two arrangements, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

I claim as my invention:

1. A thermostat comprising a supporting structure, and a bimetallic element comprising a plurality of longitudinally extending strips rigidly attached to the supporting structure, an adjusting member engaging such element when in its closed position and a contact-carrying portion, the latter portion of such element being retained when in a contact-engaged position within the actual neutral zone of such bimetallic element as determined by such contact when the element is in an unrestrained condition.

2. In a thermostat having a supporting structure, a bimetallic element rigidly attached to said structure, cooperating contacts at least one of which is attached to a movable portion of the bimetallic element, and an adjusting screw cooperating with the bimetallic element when in a closed position, the contact-carrying portion of such bimetallic element being retained in such closed position within the neutral zone of the element as determined by the operation of the element when in an unrestrained condition.

3. In a thermostatic structure, the combination of a support and an elognated bimetallic element attached by one end thereof to such support with movable exterior strips and a movable central strip joined to an exterior movable end portion, said element when in a closed position being retained so that the movable end portion is positioned within the neutral zone of such element as determined by such element when operating in an unrestrained manner.

4. A thermostat comprising a supporting structure, a stationary contact, an elongated inherently snap-acting bimetallic member, and a movable contact associated with a movable portion thereof for engagement with the stationary contact, said bimetallic member being rigidly attached to the supporting structure so that when such member is in a contact engaged position said movable portion of the bimetallic member is positioned within the neutral zone of the member.

5. A thermostat comprising a supporting structure, a stationary contact, an elongated bimetallic member, a movable contact associated with a movable portion thereof for engagement with the stationary contact, said bimetallic member being rigidly attached by a second portion thereof to the supporting structure, and an adjusting member engaging the bimetallic member at a third portion, said bimetallic member being supported at said three portions when in a contact-engaged position with said movable portion being retained within the actual neutral zone.

6. A thermostat comprising a supporting structure, a stationary contact, an elongated bimetallic member having two end portions, a movable contact attached to one end of said end portions for engagement with the stationary contact, said member being rigidly attached by said second end portion to the supporting structure, and an adjusting member engaging the bimetallic member intermediate the end portions, said bimetallic member being supported at said end portions and by the adjusting member when in a contact-engaged position with said one portion being retained within the actual neutral zone.

PAUL R. LEE.